(12) United States Patent
D'Souza

(10) Patent No.: US 12,554,718 B1
(45) Date of Patent: Feb. 17, 2026

(54) CODEWORD-NATIVE DATABASE MANAGEMENT PLATFORM EXTENSION

(71) Applicant: AtomBeam Technologies Inc., Moraga, CA (US)

(72) Inventor: Julius D'Souza, New York, NY (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/012,897

(22) Filed: Jan. 8, 2025

(51) Int. Cl.
*G06F 16/2455* (2019.01)
*G06F 9/50* (2006.01)

(52) U.S. Cl.
CPC ........ *G06F 16/2455* (2019.01); *G06F 9/5005* (2013.01)

(58) Field of Classification Search
CPC ........................... G06F 9/5005; G06F 16/2455
USPC ......................................................... 707/769
See application file for complete search history.

(56) References Cited

U.S. PATENT DOCUMENTS

| | | | | |
|---|---|---|---|---|
| 6,822,589 B1 * | 11/2004 | Dye | ................ | H04N 19/42 |
| | | | | 341/51 |
| 6,879,266 B1 * | 4/2005 | Dye | ................ | H03M 7/40 |
| | | | | 711/170 |
| 7,190,284 B1 * | 3/2007 | Dye | ................ | G06F 12/023 |
| | | | | 711/170 |
| 8,073,047 B2 * | 12/2011 | Fallon | ................ | H04N 19/176 |
| | | | | 375/240 |
| 8,577,902 B1 * | 11/2013 | Ye | ................ | H03M 7/3077 |
| | | | | 707/693 |
| 8,862,625 B2 * | 10/2014 | Meiyyappan | ....... | G06F 16/2453 |
| | | | | 707/791 |
| 9,201,652 B2 * | 12/2015 | Larin | ................ | G06F 12/00 |
| 10,055,454 B2 * | 8/2018 | Varakin | ................ | G06F 16/2453 |
| 10,313,675 B1 * | 6/2019 | Lin | ................ | H04N 19/147 |
| 10,572,153 B2 * | 2/2020 | Singhai | ................ | G06F 3/0673 |
| 10,715,177 B2 * | 7/2020 | Ki | ................ | H03M 7/6088 |
| 10,785,485 B1 * | 9/2020 | Girard | ................ | H04N 19/196 |
| 10,885,030 B2 * | 1/2021 | Hayamizu | ................ | G06F 16/21 |
| 11,055,284 B1 * | 7/2021 | Vogelsgesang | ..... | G06F 16/2454 |
| 12,229,125 B2 * | 2/2025 | Li | ................ | G06F 16/221 |

(Continued)

*Primary Examiner* — Hanh B Thai

(74) *Attorney, Agent, or Firm* — Galvin Patent Law LLC; Brian R. Galvin

(57) ABSTRACT

A codeword-native database management platform enables efficient processing of database operations by working directly with compressed data. The system implements multiple compression schemes including Huffman, alphabetic, and neural compression, with support for conditional variants and constraints. A hybrid architecture manages both compressed and uncompressed data formats, allowing for seamless operation across different data representations. The system includes specialized components for query processing, storage management, and client-server communication, all optimized for compressed data operations. Query execution plans are generated to minimize decompression requirements while maintaining performance efficiency. The system employs compression-aware buffer management and indexing strategies, enabling direct operations on compressed keys. This approach significantly reduces storage requirements and improves query performance by eliminating unnecessary decompression cycles, while maintaining full ACID compliance and supporting existing database functionalities.

15 Claims, 7 Drawing Sheets

(56) References Cited

U.S. PATENT DOCUMENTS

| | | | |
|---|---|---|---|
| 2001/0038642 A1* | 11/2001 | Alvarez, II | H03M 7/3088 370/477 |
| 2001/0054131 A1* | 12/2001 | Alvarez, II | H03M 7/40 711/170 |
| 2003/0041110 A1* | 2/2003 | Wenocur | H04L 63/126 709/206 |
| 2004/0090351 A1* | 5/2004 | Wu | H03M 7/30 341/50 |
| 2008/0131258 A1* | 6/2008 | Liepold | F04D 27/0269 700/282 |
| 2008/0162521 A1* | 7/2008 | Browning | G06F 21/6227 |
| 2009/0048841 A1* | 2/2009 | Pollet | G10L 13/07 704/260 |
| 2009/0187673 A1* | 7/2009 | Ramjee | H04L 67/5651 709/247 |
| 2009/0254516 A1* | 10/2009 | Meiyyappan | G06F 16/134 707/999.005 |
| 2009/0254532 A1* | 10/2009 | Yang | G06F 16/221 |
| 2011/0182352 A1* | 7/2011 | Pace | H04N 19/543 375/240.1 |
| 2011/0246432 A1* | 10/2011 | Yang | G06F 16/221 707/693 |
| 2014/0108361 A1* | 4/2014 | Biswas | G06F 16/29 707/693 |
| 2014/0324821 A1* | 10/2014 | Meiyyappan | G06F 16/24562 707/715 |
| 2015/0363456 A1* | 12/2015 | Raman | G06F 16/282 707/693 |
| 2017/0123977 A1* | 5/2017 | Krishnamurthy | G06F 3/0608 |
| 2017/0179978 A1* | 6/2017 | Kawamura | G06F 16/1794 |
| 2018/0152535 A1* | 5/2018 | Sade | G16B 50/50 |
| 2020/0320213 A1* | 10/2020 | Fuhry | G06F 16/2455 |
| 2021/0034598 A1* | 2/2021 | Arye | G06F 16/288 |
| 2021/0109974 A1* | 4/2021 | Shekhar | G06F 3/0631 |
| 2021/0409037 A1* | 12/2021 | Chuggani | H03M 7/6011 |
| 2022/0236904 A1* | 7/2022 | Miller | G06F 3/0688 |
| 2024/0022260 A1* | 1/2024 | Cook | H03M 7/4093 |
| 2024/0134858 A1* | 4/2024 | Schieferstein | G06F 16/24549 |
| 2024/0202166 A1* | 6/2024 | Dhuse | G06F 16/221 |
| 2024/0319901 A1* | 9/2024 | Miller | G06F 16/215 |
| 2024/0378197 A1* | 11/2024 | Emani | G06F 16/2452 |
| 2024/0411756 A1* | 12/2024 | Li | G06F 16/24561 |
| 2024/0411812 A1* | 12/2024 | Brossard | G06F 16/908 |
| 2024/0427790 A1* | 12/2024 | Cai | G06F 16/254 |
| 2025/0021566 A1* | 1/2025 | Gladwin | G06F 16/2428 |

* cited by examiner

CODEWORD-NATIVE DATABASE MANAGEMENT PLATFORM EXTENSION

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention is in the field of database management systems, and more particularly to systems and methods for managing compressed data in database operations through a codeword-native approach.

Discussion of the State of the Art

Traditional database management systems (DBMS) are designed to operate primarily on uncompressed data, requiring substantial storage resources and processing overhead for data management. While these systems may incorporate compression techniques as an auxiliary feature, such compression is typically implemented as an external layer rather than being intrinsic to the database operations. This approach necessitates frequent compression and decompression cycles during routine database operations, resulting in significant computational overhead and reduced performance.

Existing compression approaches in database systems generally fall into two categories: block-level compression, which compresses large segments of data as single units, and column-level compression, which applies basic encoding schemes to individual columns. Block-level compression, while achieving high compression ratios, requires complete block decompression for accessing any portion of the data, making it inefficient for selective queries or random access patterns. Column-level compression schemes, though more granular, typically implement simple dictionary encoding or run-length encoding, failing to optimize for specific data characteristics or query patterns.

Current DBMS architectures handle compression through intermediate layers that sit between the storage and query processing components. This layered approach means that data must be decompressed before most database operations can be performed, including basic operations like comparison, sorting, and joining. The requirement for decompression not only increases CPU utilization but also results in higher memory consumption as uncompressed data must be maintained in memory during query processing. Furthermore, the network bandwidth between database clients and servers is often unnecessarily consumed by the transmission of decompressed data.

Recent advances in compression algorithms and hardware capabilities have not been fully leveraged in database systems. While specialized compression schemes like Huffman coding, alphabetic coding, and Tunstall coding offer potential benefits for different types of data and access patterns, database systems typically employ a one-size-fits-all approach to compression. Additionally, the emergence of machine learning techniques for data compression, such as neural network-based autoencoders, has opened new possibilities for efficient data representation that remain largely unexploited in current database systems.

Existing solutions also struggle with hybrid scenarios where both compressed and uncompressed data must be managed simultaneously. This limitation forces organizations to choose between full compression with its associated overhead or no compression at all, rather than allowing for flexible, workload-optimized compression strategies. The lack of native support for compressed operations means that even when compression is used, the potential performance benefits are often outweighed by the computational costs of compression-related operations.

What is needed is a codeword-native database management platform extension that fundamentally reimagines how compression is integrated into database operations, enabling direct processing of compressed data while supporting multiple compression schemes optimized for different data types and access patterns.

SUMMARY OF THE INVENTION

Accordingly, the inventor has conceived and reduced to practice, a codeword-native database management platform enables efficient processing of database operations by working directly with compressed data. The system implements multiple compression schemes including Huffman, alphabetic, and neural compression, with support for conditional variants and constraints. A hybrid architecture manages both compressed and uncompressed data formats, allowing for seamless operation across different data representations. The system includes specialized components for query processing, storage management, and client-server communication, all optimized for compressed data operations. Query execution plans are generated to minimize decompression requirements while maintaining performance efficiency. The system employs compression-aware buffer management and indexing strategies, enabling direct operations on compressed keys. This approach significantly reduces storage requirements and improves query performance by eliminating unnecessary decompression cycles, while maintaining full ACID compliance and supporting existing database functionalities.

According to a preferred embodiment, computing system for database operation execution using native compressed data is disclosed, the computing system comprising: one or more hardware processors configured for: receiving a database query directed to data stored in a compressed format; determining compression characteristics of the stored data, the compression characteristics comprising compression schemes and encoding parameters employed; generating a query execution plan that enables direct operations on the compressed data without requiring complete decompression; executing the database query by performing operations directly on the compressed data according to the generated execution plan; and providing query results while maintaining data in a compressed state where possible.

According to another preferred embodiment, computer-implemented method executed on a database management platform for database operation execution using native compressed data is disclosed, the computer-implemented method comprising: receiving a database query directed to data stored in a compressed format; determining compression characteristics of the stored data, the compression characteristics comprising compression schemes and encoding parameters employed; generating a query execution plan that enables direct operations on the compressed data without requiring complete decompression; executing the database query by performing operations directly on the compressed data according to the generated execution plan; and providing query results while maintaining data in a compressed state where possible.

According to another preferred embodiment, system for database operation execution using native compressed data is disclosed, comprising one or more computers with executable instructions that, when executed, cause the system to: receive a database query directed to data stored in a compressed format; determine compression characteristics of the stored data, the compression characteristics comprising compression schemes and encoding parameters employed; generate a query execution plan that enables direct operations on the compressed data without requiring complete decompression; execute the database query by performing operations directly on the compressed data according to the generated execution plan; and provide query results while maintaining data in a compressed state where possible.

According to an aspect of an embodiment, determining compression characteristics comprises: identifying compression schemes applied to different data portions; analyzing compression constraints and conditional variants in use; evaluating order-preservation requirements for compressed data; and determining opportunities for direct compressed operations.

According to an aspect of an embodiment, generating the query execution plan comprises: analyzing query requirements against compression characteristics; identifying operations executable directly on compressed data; determining necessary format transitions; optimizing operation ordering to minimize decompression; and allocating resources for compressed data processing.

According to an aspect of an embodiment, executing the database query comprises: performing comparison operations directly on compressed keys; managing hybrid operations across compressed and uncompressed data; maintaining transactional consistency during compressed operations; utilizing compression-aware buffer management; and coordinating format transitions when required.

According to an aspect of an embodiment, providing query results comprises: determining client capability for handling compressed data; maintaining compression where supported by client systems; performing selective decompression based on client requirements; optimizing result transmission through compressed data transfer; and ensuring consistency of compression metadata across client-server boundaries.

BRIEF DESCRIPTION OF THE DRAWING FIGURES

DETAILED DESCRIPTION OF THE INVENTION

Figure 1:
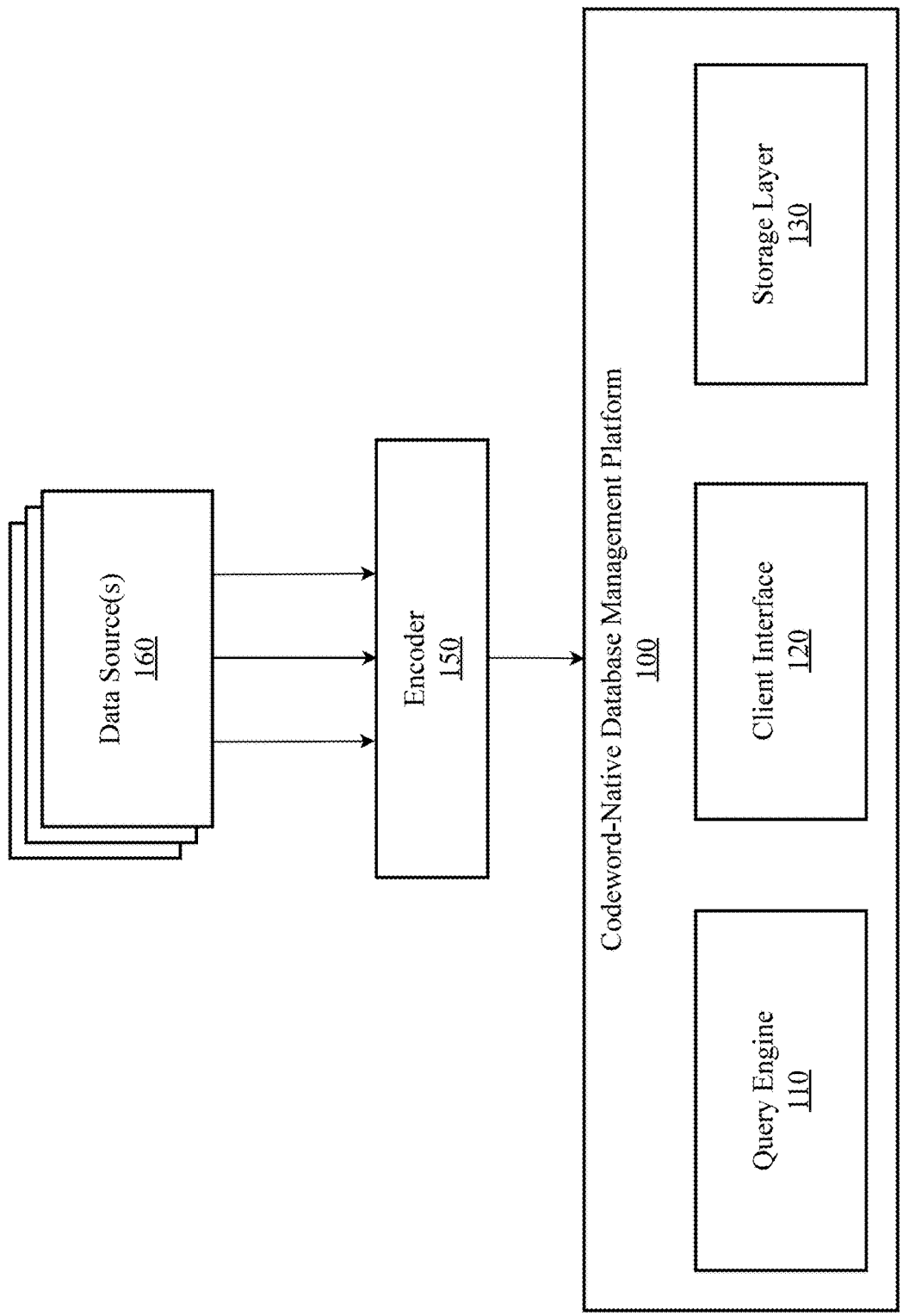
FIG. 1 is a block diagram illustrating an exemplary system architecture for a codeword-native database management platform extension, according to an embodiment.

The inventor has conceived, and reduced to practice, a codeword-native database management platform enables efficient processing of database operations by working directly with compressed data. The system implements multiple compression schemes including Huffman, alphabetic, and neural compression, with support for conditional variants and constraints. A hybrid architecture manages both compressed and uncompressed data formats, allowing for seamless operation across different data representations. The system includes specialized components for query processing, storage management, and client-server communication, all optimized for compressed data operations. Query execution plans are generated to minimize decompression requirements while maintaining performance efficiency. The system employs compression-aware buffer management and indexing strategies, enabling direct operations on compressed keys. This approach significantly reduces storage requirements and improves query performance by eliminating unnecessary decompression cycles, while maintaining full ACID compliance and supporting existing database functionalities.

The systems and methods described herein support a codeword-native database management platform extension that enables direct operations on compressed data through specialized components and methods. The system comprises an encoder component, storage layer, query engine, and client-server interface, all optimized for handling compressed data in the form of codewords while maintaining efficient database operations.

Tunstall coding represents a distinctive approach to data compression in database systems by implementing a variable-to-fixed length compression scheme that converts variable-length input sequences into fixed-length codewords. Unlike traditional Huffman coding, which maps fixed-length input to variable-length output, Tunstall coding constructs a dictionary of frequently occurring variable-length input sequences and maps these to fixed-length output codewords. This characteristic makes it particularly valuable for the codeword-native database platform, especially in operations requiring random access to compressed data. Since each codeword maintains a consistent length, the system can perform direct position calculations for compressed records without scanning through variable-length encodings, for instance, with 16-bit Tunstall codewords, accessing the nth compressed record simply requires jumping to position n*16 bits.

The platform may implement Tunstall coding with several optimizations designed for database operations. These include, but are not limited to, adaptive dictionary updates that evolve based on observed data patterns, support for multiple dictionary sizes to accommodate different compression ratio requirements, and specialized variants optimized for specific data types such as numeric sequences or text data. The implementation also features tight integration with a buffer management system, optimized specifically for fixed-length access patterns. For example, when handling a timestamp column exhibiting recurring patterns in temporal sequences, Tunstall coding enables both effective compression and efficient random access while maintaining predictable performance characteristics for query operations. The coding scheme's fixed-length output characteristics align particularly well with hardware memory architectures and system-level optimizations, making it an valuable addition to the platform's compression arsenal, especially for scenarios where predictable access patterns and performance consistency are important Alphabetic coding, also known as Hu-Tucker coding, represents a compression scheme that maintains lexicographical order relationships in the compressed data representation. Unlike standard Huffman coding, which optimizes purely for compression ratio, Hu-Tucker coding generates prefix-free codes while ensuring that the binary representations of codewords maintain the same ordering as the original symbols they represent. This order-preserving property makes it particularly valuable in database systems where range queries and sorted operations are frequent, as it enables direct comparisons and range operations on compressed data without requiring decompression.

In the codeword-native database platform, Hu-Tucker coding may be implemented in optimizing operations that rely on order relationships. The implementation may comprise sophisticated adaptations that balance compression efficiency with operational requirements. For example, when compressing a column of timestamps or numerical values frequently used in range queries, the platform can employ Hu-Tucker coding to maintain order relationships while achieving compression. This enables a query engine to perform range comparisons, sorting, and prefix matching operations directly on the compressed data, significantly improving query performance by eliminating the need for decompression during these common database operations. The platform implements several optimizations specific to Hu-Tucker coding, including, but not limited to, support for conditional variants that enforce maximum codeword length constraints, balanced tree structures for more predictable access patterns, and adaptive codebook updates based on data distribution changes.

The integration of Hu-Tucker coding extends beyond basic compression to influence multiple aspects of the database system. According to an aspect, a storage layer implements specialized index structures optimized for order-preserving compressed keys, enabling efficient range-based index scans. A query optimizer understands the characteristics of Hu-Tucker compressed columns and can generate execution plans that leverage direct compressed operations. For instance, when processing a query with range predicates on a Hu-Tucker compressed column, the optimizer can push down these predicates to be evaluated directly on compressed values, significantly reducing I/O and processing overhead. This deep integration of alphabetic coding throughout the platform's architecture enables a unique combination of storage efficiency and operational performance, particularly for workloads with significant ordering and range-based requirements.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for a codeword-native database management platform extension, according to an embodiment. According to the embodiment, codeword-native database management platform 100 comprises a query engine 110, a client interface 120, and a storage layer 130. As shown, platform 100 may integrate with one or more encoders 150 which process a plurality of data from various data sources 160 to create compressed codeword representations of the plurality of data. The compressed codewords may be stored in an appropriate data storage system. The architecture of a codeword-native DBMS is built around the fundamental concept of operating directly on compressed data using one or more of a variety of compression schemes such as Huffman, alphabetic, and Tunstall coding schemes, with careful integration across all system components to maintain efficiency and data consistency.

According to the embodiment, storage layer 130 forms the foundation, comprising various subcomponents. First, a record store manages compressed tuple storage using a hybrid approach, employing one or more compression schemes such as alphabetic codes for columns requiring range operations and Huffman coding for columns only needing equality comparisons. The record store handles variable-length compressed records and maintains metadata about compression schemes used per column. Second, the index manager maintains B-tree and bitmap indexes operating directly on compressed keys, with specialized comparison operations that work without decompression when using alphabetic codes. Third, the codebook store serves as the central repository for compression dictionaries, managing codebook versioning, distribution, and lifecycle. The codebook store also handles adaptive compression by monitoring data patterns and triggering codebook updates when compression efficiency drops below configurable thresholds.

According to the embodiment, query engine 110 is extensively modified to work with compressed data efficiently. A query parser first analyzes incoming SQL queries and identifies operations that can be performed directly on compressed data. A query planner creates execution plans that minimize decompression operations, using cost-based optimization that considers both compression ratios and operation types. For example, when planning a range query on a column using alphabetic codes, the planner can schedule direct comparison operations on compressed values. A query executor implements specialized operators for compressed data processing, including comparison operators that understand various compression schemes (e.g., Huffman, alphabetic, Tunstall, etc.), join algorithms that can operate on compressed keys, and aggregation functions that work with compressed values where possible.

According to an embodiment, client interface layer 120 manages communication between database clients and the server, maintaining compression state consistency. A client manager handles query routing and result set processing, while a codebook sync component ensures that clients and servers maintain consistent codebook versions. This component implements efficient protocols for transferring compressed data and handles codebook distribution to clients when needed.

Provided is an example scenario to illustrate how codeword-native database management platform 100 may operate: consider a typical e-commerce database query where an analyst needs to retrieve all pending orders from the first quarter of 2024. The query "SELECT*FROM orders WHERE order_date BETWEEN '2024-01-01' AND '2024-03-31' AND status='PENDING'" arrives at the system, initiating a sophisticated compressed data processing workflow. The query parser first examines the query and recognizes two distinct compression patterns in play: the order_date field uses alphabetic coding to preserve ordering relationships, while the status field employs Huffman coding for optimal compression of categorical data. This distinction is important because it allows range operations to be performed directly on the compressed order_date values.

As the query moves to execution, the query planner develops an optimized strategy that leverages these compression characteristics. It determines that the date range comparison can be performed entirely in compressed space, as the alphabetic coding scheme preserves the ordering of dates. For the status check, the planner identifies that a simple equality comparison can be performed using the Huffman-coded value for 'PENDING', which is looked up from the system's codebook. The planner then creates an execution path that minimizes decompression operations, prioritizing filtered access to the compressed records.

The query executor brings this plan to life by first accessing the storage layer, which maintains records in their compressed format. It efficiently retrieves compressed records, leveraging any available indexes that also store compressed keys. For each record, it performs the date range comparison directly on the alphabetically coded order_date values—comparing them with the compressed representations of '2024-01-01' and '2024-03-31'. Simultaneously, it checks the Huffman-coded status field against the compressed value of 'PENDING'. This direct comparison on compressed values significantly reduces both I/O and CPU overhead compared to traditional systems that would require decompression before comparison.

The matching compressed records flow through the system to the client interface layer, where the final processing occurs. The client manager, maintaining a synchronized copy of the relevant codebooks, handles the necessary decompression only at this final stage. It reconstructs the original values using the appropriate decompression schemes for each field—alphabetic decoding for dates and Huffman decoding for status values. Throughout this process, the system maintains transactional consistency while working primarily with compressed data, demonstrating how compression can be deeply integrated into core database operations while preserving ACID (atomicity, consistency, isolation, durability) properties.

This example highlights the system's ability to process queries efficiently by keeping data compressed throughout most of the query lifecycle, only decompressing at the final client interface stage.

As shown, an encoder 150 is present and serves as the primary ingestion point for data from various sources 160. The encoder implements a pipeline that analyzes incoming data characteristics to determine optimal compression schemes for different data types and access patterns. It may maintain communication channels with both a storage layer 130 for persisting compressed data and a query engine 110 for establishing query-optimized compression patterns. The encoder coordinates with a codebook store to manage compression scheme evolution, implementing a feedback loop that adapts compression strategies based on observed query patterns and data characteristics. When new data arrives, the encoder analyzes its statistical properties, access patterns from similar historical data, and anticipated query requirements to select appropriate compression schemes.

According to some embodiments, storage layer 130 may comprise enhanced metadata management to track the provenance of compressed data, maintaining relationships between original data sources, compression schemes used, and the resulting codewords. This may comprise extending record store functionality to handle multiple compression versions of the same data when required for different query patterns. An index manager may be configured to maintain source-aware indexing strategies that can optimize access patterns based on the original data source characteristics.

The query engine's capabilities are extended to understand data source characteristics when planning and executing queries. A query planner may incorporate source-specific statistics and compression patterns into its optimization decisions, while a query executor may implement specialized operators that can efficiently handle different compression schemes based on data source characteristics. The engine maintains awareness of which compression schemes are optimal for different types of operations on different data sources, using this information to make intelligent decisions about query execution strategies.

A Huffman encoding subsystem may be implement an adaptive compression strategy optimized for categorical and low-cardinality data. It maintains dynamic frequency tables for different data sources, implementing a sophisticated sliding window mechanism to adapt to changing data patterns. The subsystem includes specialized optimizations for handling numeric data through variable-byte encoding when appropriate, and implements a hybrid approach that can switch between static and dynamic Huffman coding based on data stability patterns. For data sources with relatively stable value distributions, it maintains persistent codebooks, while for sources with volatile patterns, it implements a rolling compression scheme with periodic codebook updates.

An alphabetic coding subsystem focuses on maintaining order-preserving compression critical for range queries and sorted operations. According to an aspect, it implements the Hu-Tucker algorithm with several enhancements for handling numeric data ranges efficiently. The subsystem includes specialized handling for datetime values, implementing a hierarchical compression scheme that maintains order relationships at different temporal granularities. For floating-point numbers, it can implement a normalized representation that preserves ordering while achieving good compression ratios. The alphabetic encoder maintains awareness of common query patterns on the data, optimizing codeword length distributions to minimize decompression requirements for frequent operations.

A Tunstall coding subsystem provides fixed-length codeword compression, particularly useful for systems requiring constant-time random access to compressed data. It implements an adaptive dictionary size based on data characteristics and memory constraints, with specialized optimizations for handling mixed data types. The subsystem includes enhancements for handling numeric sequences efficiently, implementing a delta-encoding scheme within the Tunstall framework for improved compression of monotonic sequences. For string data, it may implement a hybrid approach that combines Tunstall coding with character n-gram analysis for improved compression ratios.

According to some embodiments, encoder 150 further comprises a decision engine that selects the appropriate compression scheme based on multiple factors. This engine analyzes data characteristics (such as cardinality, value distribution, and update frequency), query patterns (including common operation types and access frequencies), and system constraints (like memory availability and processing capacity). It may implement a learning mechanism that refines its compression strategy choices based on observed query performance and storage efficiency. The decision engine can maintain separate optimization strategies for different data sources, recognizing that optimal compression approaches may vary significantly based on data source characteristics and usage patterns.

According to some embodiments, encoder 150 is configured as an autoencoder for generating latent vector embeddings as codewords via neural compression. The autoencoder component implements a deep neural network architecture where the encoder network compresses input data into fixed-length latent vector representations (codewords) in a lower-dimensional space, while the decoder network learns to reconstruct the original data from these latent representations. The system may implement a specialized training pipeline that optimizes the autoencoder for both compression efficiency and query-relevant feature preservation, using a composite loss function that balances reconstruction accuracy with the maintenance of important data relationships and patterns. During operation, the encoder portion generates compact latent vector codewords that capture essential data characteristics while significantly reducing storage requirements. These latent vectors are then stored and indexed in the database system, with specialized distance metrics implemented in the query engine to enable similarity searches and range queries directly in the latent space. The system maintains a versioning mechanism for the autoencoder models, coordinating with the codebook store to manage model updates and ensure consistency between encoding and decoding operations across the distributed system. This approach is particularly effective for high-dimensional data types or complex data patterns where traditional compression schemes might be less efficient, enabling both storage optimization and advanced query capabilities through learned representations.

In some embodiments, encoder 150 may be implemented as a data deconstruction engine working in combination with a library manager component which work together to compress a data stream into a plurality of codewords.

Figure 2:
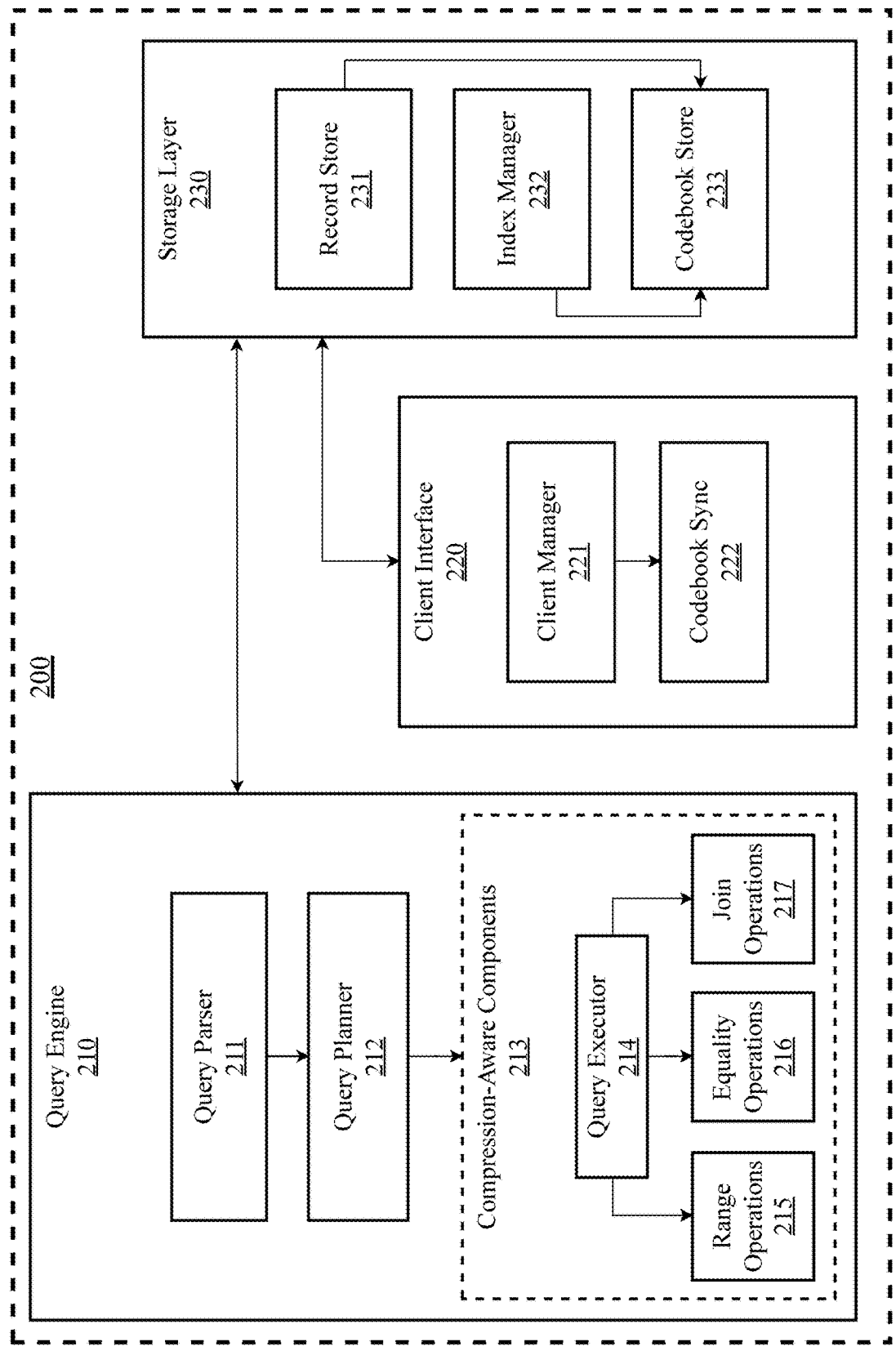
FIG. 2 is a block diagram illustrating an exemplary embodiment of the codeword-native database management platform.

FIG. 2 is a block diagram illustrating an exemplary embodiment of the codeword-native database management platform. As illustrated, codeword-native database management platform 200 comprises a query engine 210, a client interface 220, and a storage layer 230.

The storage layer of a codeword-native database system is designed to manage compressed data efficiently while maintaining high performance and data integrity. The record store 231 serves as the primary data repository. In some embodiments, record store 231 can implement a sophisticated page-based storage system that handles variable-length compressed records. In some embodiments, each page maintains a slot directory that maps to compressed tuples, with page headers containing compression metadata including codebook version identifiers and compression schemes used.

The record store may be configured to implement a hybrid compression strategy where each column's data is compressed using one or more compression schemes (e.g., Huffman, alphabetic, or Tunstall coding) based on access patterns and query requirements. For example, datetime columns and numeric fields that frequently appear in range queries may be compressed using alphabetic codes, preserving order relationships through techniques such as using a min(li−1, li) comparison approach for maintaining order properties. Meanwhile, categorical columns and fields primarily used in equality comparisons may employ Huffman coding for optimal compression ratios.

According to some embodiments, index manager 232 maintains one or more indexes (e.g., B-tree and bitmap indexes) that operate directly on compressed keys, with a specialized architecture that understands compressed value comparisons. In B-tree indexes, the node structure can be modified to handle variable-length compressed keys while maintaining the B-tree's balance properties. The index pages store compressed values and may further include metadata about the compression scheme used (and/or other relevant information), enabling direct comparison operations without decompression when alphabetic coding is employed. For Huffman-coded fields, the index manager may be configured to maintain lookup structures that optimize equality comparisons on compressed values. According to an aspect, index manager 232 communicates with record store 231 through a shared buffer pool that maintains pages in compressed format, reducing I/O overhead and memory utilization.

The codebook store 233 is configured as the central authority for compression schemes and maintains the system's codebooks using a versioned approach. It implements a caching mechanism where frequently accessed codebook entries are kept in memory while less frequently used portions are managed through a separate buffer pool. The codebook store monitors compression efficiency through statistics gathering and implements adaptive compression by tracking value frequencies and distribution patterns. For instance, when compression efficiency drops below configured (e.g., predetermined) thresholds, it initiates codebook updates through a carefully orchestrated process that ensures consistency across all system components. This process may comprise one or more of creating new codebook versions, updating metadata in affected pages, and coordinating with a buffer manager to handle cached pages with old compression schemes.

Data flow between these components follows carefully designed pathways optimized for compressed operations. When the record store needs to insert or modify data, it first consults the codebook store to obtain current compression schemes and codebook versions. The compressed data is then written to pages, with the index manager being notified of any changes that affect indexed fields. the index manager consults the same codebook versions through the codebook store to maintain consistency in compressed key representations. During query processing, when the query executor requests data, the record store retrieves compressed pages and passes them through the buffer pool, where they remain compressed until absolutely necessary. The index manager assists in this process by providing rapid access paths to compressed records while maintaining the ability to perform comparisons directly on compressed values when using alphabetic coding.

According to an aspect, the architecture further comprises a buffer management system that spans all storage layer components. The buffer manager maintains pages in compressed format and implements specialized page replacement algorithms that consider both access patterns and compression schemes. It coordinates with the codebook store to ensure that necessary codebooks are available for pages in the buffer pool, implementing a hierarchical caching strategy where codebook entries are cached at multiple levels based on usage patterns. This integrated approach to buffer management significantly reduces memory requirements while maintaining high performance through intelligent caching of both compressed data and codebook entries.

Provided are two exemplary specialized page replacement algorithms designed specifically for a codeword-native database system's buffer manager, taking into account the unique characteristics of compressed data pages and their access patterns. Other page replacement algorithms may be implemented in various embodiments of the disclosed systems and methods. These algorithms demonstrate how traditional buffer replacement policies can be adapted to handle the unique characteristics of compressed data pages while maintaining high performance and efficient memory utilization.

In some embodiments, a compression-aware least recently used (CA-LRU) algorithm is implemented which extends traditional LRU by incorporating compression-specific metrics into its replacement decisions. When selecting a page for eviction, CA-LRU considers not only the page's last access time but also its compression ratio and the computational cost of recompressing the page if it has been modified. The algorithm maintains a modified LRU chain where each entry includes metadata about the page's compression state: its original compressed size, current size (which may be different if the page has been partially decompressed for operations), and the specific codebook version used for compression. When a page needs to be evicted, CA-LRU calculates a composite score based on both recency of access and compression metrics. For example, if two pages have similar access times, the algorithm preferentially keeps pages with higher compression ratios (saving memory) or pages that would be more expensive to recompress if modified. The algorithm also maintains a small separate queue for pages containing frequently accessed codebook entries, ensuring that these critical pages remain in memory to support efficient compression operations. This approach can be particularly effective for workloads with mixed access patterns, where some compressed pages are read frequently but rarely modified, while others undergo frequent updates requiring recompression.

In some embodiments, a codebook-coordinated clock (CC-Clock) algorithm implements a modified clock replacement policy specifically designed for compressed pages that share codebook dependencies. The algorithm maintains a circular buffer of page frames, with each frame containing additional metadata about codebook relationships and compression state. As the clock hand moves, it considers not just the reference bit but also the codebook dependency graph; if a page uses a codebook that's actively being used by multiple other pages in memory, it receives a higher retention priority. The algorithm maintains a hierarchical structure where pages are grouped by their codebook usage, with each group having its own clock hand moving at a rate proportional to the group's aggregate access frequency. When a page must be evicted, CC-Clock first identifies candidate pages within groups that have low codebook sharing, then applies traditional clock algorithm criteria within those groups. This approach is particularly effective in systems with many different compression schemes, as it naturally clusters pages that share codebook dependencies and minimizes the need to reload codebooks when pages are brought back into memory. The algorithm also includes special handling for pages that have been partially decompressed, maintaining a separate clock cycle for these pages with faster movement to encourage either full decompression or recompression, thereby optimizing memory usage.

This exemplary storage layer design demonstrates how compression can be integrated into database storage while maintaining efficient access patterns and ensuring data consistency. The careful coordination between components, particularly in handling compressed data formats and maintaining codebook consistency, enables the system to achieve both space efficiency and query performance goals while supporting the full range of database operations expected in a modern DBMS.

The query processing components of query engine 210 in codeword-native database system represent an adaptation of traditional query processing to handle compressed data efficiently while maintaining high performance. The query parser 211 is configured as the first stage of query processing, implementing a modified parsing mechanism that is compression-aware. When receiving an SQL query, it can perform traditional lexical and syntactic analysis while also consulting codebook store 233 to understand the compression schemes used for referenced columns. The parser can be configured to build an enhanced syntax tree that comprises compression metadata, marking operations that can be performed directly on compressed data versus those requiring decompression. For example, when parsing a predicate like "order_date BETWEEN '2024-01-01' AND '2024-03-31'", the parser identifies that order_date uses alphabetic coding and annotates the syntax tree to indicate that compressed comparison is possible. Similarly, for predicates involving Huffman-coded columns, it marks opportunities for direct equality comparisons on compressed values.

The query planner 212 takes the annotated syntax tree and develops execution strategies optimized for compressed data processing. It may implement a cost-based optimizer that incorporates compression-specific metrics into its decision-making process. The planner considers factors such as compressed data size, decompression costs, and the ability to perform operations directly on compressed values. It maintains statistics about compression ratios and operation costs, using these to make informed decisions about query execution paths. For instance, when planning a join operation, it evaluates whether to perform the join on compressed keys (possible with alphabetic coding) or to decompress the data first. The planner generates multiple candidate plans, incorporating compression-aware cost estimates that account for both I/O savings from compressed data and CPU costs for any necessary decompression operations.

A subset of query engine components referred to as compression-aware components 213 may be present in various embodiments. A query executor 214 implements specialized operators 215, 216, 217 designed to work directly with compressed data whenever possible. It maintains a set of compression-aware physical operators including, but not limited to, modified versions of sequential scan, index scan, nested loop join, hash join, and sort operations. These operators understand various encoding schemes (e.g., Huffman, alphabetic, Tunstall, etc.) and can perform operations directly on compressed values when appropriate. For example, the 'sort' operator can directly order alphabetically coded values without decompression, while the hash join operator includes optimizations for handling Huffman-coded keys. The executor manages execution pipelines that maintain data in compressed format as long as possible, only decompressing when absolutely necessary for operations that cannot be performed on compressed values.

Data flow between these components follows a protocol optimized for compressed operation. When a query first arrives, the parser communicates with the codebook store to retrieve compression metadata, building an enhanced syntax tree that includes this information. This annotated tree passes to the planner, which consults historical statistics and cost models maintained in a compression-aware system catalog. The planner's output includes both traditional execution plan elements and compression-specific directives that guide the executor's operation. The executor then coordinates with the storage layer through a specialized buffer manager that maintains pages in compressed format, implementing careful memory management that considers both compressed and uncompressed data requirements.

The entire query processing pipeline incorporates one or more optimizations specifically designed for compressed data handling. According to an aspect, the system implements a sophisticated predicate pushdown mechanism that considers compression schemes when deciding which operations can be pushed closer to the data source. It comprises a modified join ordering algorithm that accounts for compression characteristics when determining optimal join sequences. The query processor also implements specialized optimization techniques for handling mixed operations involving both compressed and uncompressed data, including intelligent placement of decompression operations to minimize overhead.

In some implementations, runtime adaptation plays a role in query processing. In such implementations, the executor monitors actual execution costs and compression effectiveness during query processing, feeding this information back to the planner to refine its cost models. This feedback loop includes metrics specific to compressed data operations, such as the effectiveness of compressed comparisons and the actual costs of necessary decompression operations. The system can maintain these statistics in a compression-aware query feedback mechanism that helps optimize future similar queries.

This exemplary query processing architecture demonstrates how traditional database query processing can be enhanced to take full advantage of compressed data storage while maintaining high performance and accuracy. The careful coordination between components, particularly in handling compressed data formats and optimizing operation sequences, enables the system to achieve both space efficiency and query performance goals while supporting the full range of SQL operations expected in a modern DBMS.

The client interface layer 220 of codeword-native database management system 200 is configured to manage the complexities of compressed data communication while maintaining efficiency and consistency between clients and one or more servers. The client manager 221 is configured as the primary interface for all client-server communications, implementing a protocol that efficiently handles compressed data transfer while maintaining transparency to client applications. It manages connection states that include compression context, maintaining session-specific metadata about active codebooks and compression schemes in use. When a client initiates a connection, client manager 221 negotiates compression capabilities and establishes a shared compression context. This context includes, but is not limited to, information about which codebooks will be cached client-side and which compression operations can be performed locally. According to an aspect, client manager 221 implements a buffering system that maintains both compressed and uncompressed data buffers, intelligently deciding when to decompress results based on client capabilities and query requirements. For batch operations, it may implement a specialized batching protocol that groups similar compressed operations to maximize efficiency, particularly when dealing with repeated queries that can reuse the same compression context.

A codebook sync 222 component implements a synchronization protocol that ensures clients and servers maintain consistent compression states while minimizing network overhead. It may implement a versioned codebook distribution system where each codebook has a unique version identifier and validity period. When changes occur in the server's compression schemes, codebook sync 222 orchestrates the distribution of updated codebooks to affected clients using a differential (or other) update protocol. This protocol identifies and transmits only the changes between codebook versions, significantly reducing network traffic. The component maintains a client-side cache of frequently used codebooks with an invalidation mechanism that ensures consistency while minimizing unnecessary retransmissions. For example, when a server initiates a codebook update, the sync component first checks if any active queries depend on the old codebook version, managing a graceful transition that doesn't interrupt ongoing operations.

Data flow between these components follows pathways optimized for compressed operations. When query results are being returned to a client, the client manager first consults the compression context to determine if the client can handle compressed data directly. For clients with appropriate capabilities, it streams compressed results along with any necessary codebook updates, coordinating with the codebook sync component to ensure all required compression metadata is available. The client manager implements a protocol for handling large result sets, using a streaming mechanism that maintains compression across result batches while allowing for client-side memory management. This includes the ability to pause and resume result streaming while maintaining compression context, particularly useful for large query results.

The entire client interface layer incorporates one or more optimizations for handling compressed data efficiently. It implements a caching mechanism that maintains frequently used codebooks and compressed data patterns, reducing the need for repeated server roundtrips. The system may comprise a client-side query result cache that stores compressed data along with its compression metadata, allowing subsequent identical queries to be satisfied locally when appropriate. The interface layer may further comprise specialized protocols for bulk operations, allowing multiple compressed operations to be batched together efficiently while maintaining transactional semantics.

Error handling and recovery mechanisms can be implemented to maintain consistency in the presence of network failures or client crashes. According to an aspect, client manager 221 maintains transaction journals that include compression state, allowing operations to be properly recovered even when using compressed data. According to an aspect, codebook sync 222 implements a robust recovery protocol that can detect and repair inconsistencies in client-side codebook caches, ensuring that operations resume correctly after failures. This includes the ability to detect and resolve version conflicts that might arise during network partitions or client disconnections.

Performance optimization is a key consideration in the client interface design. The system may implement adaptive compression based on network conditions and client capabilities. For high-latency connections, it may choose to send more heavily compressed data, while for high-bandwidth local connections, it might opt for lighter compression that requires less CPU overhead. The client manager may employ monitoring capabilities that track compression effectiveness and network utilization, adjusting its strategies dynamically to optimize performance. This includes the ability to switch compression schemes on the fly based on observed patterns in query results and network conditions.

This exemplary client interface architecture demonstrates how traditional client-server database communications can be enhanced to efficiently handle compressed data while maintaining high performance and consistency. The careful coordination between components, particularly in managing compression metadata and optimizing data transfer, enables the system to achieve both network efficiency and query performance goals while supporting the full range of database operations expected in a modern distributed DBMS.

According to an embodiment, the intelligent decompression decision-making process in the codeword-native database system comprises an analysis of multiple factors, incorporating both static client capabilities and dynamic query characteristics to optimize performance. The system may implement a decision engine within the client manager that evaluates each result set against a comprehensive set of criteria before determining the optimal decompression strategy.

The decision process begins with an analysis of client capabilities, which are established during the initial connection handshake. The client manager maintains a capability profile for each connected client that includes information such as available memory, processing power, supported compression operations, and cached codebooks. For example, a thick client running on a powerful workstation might be capable of handling complex decompression operations locally, while a thin mobile client might require server-side decompression. The system extends this static profile with dynamic performance metrics gathered during the session, including observed decompression times, network latency, and throughput characteristics. This dynamic profiling allows the system to adapt its decisions based on real-world performance rather than just theoretical capabilities.

The client manager examines the query's result processing requirements, considering factors such as whether the results need to be displayed immediately, processed further client-side, or stored for later use. For example, if a query result will be used for client-side aggregation or sorting, the system might maintain the data in compressed form using alphabetic coding to enable direct operations on compressed values. The decision engine also considers the query's projection list, if only a subset of columns are being returned, it might selectively decompress only the required columns while keeping others compressed. This analysis includes examination of any client-side filtering or processing requirements specified in the query, as these might influence whether keeping data compressed would provide performance benefits.

According to an aspect, the system implements a cost model that weighs multiple factors to make the final decompression decision. This model considers network bandwidth consumption (compressed vs. uncompressed size), processing costs (server-side vs. client-side decompression), memory utilization, and expected query result usage patterns. For example, when dealing with a large result set that will be displayed incrementally to the user, the system might implement a hybrid approach where the initial viewport of data is decompressed immediately while maintaining the remainder in compressed form. The cost model incorporates historical performance data from similar queries and result sets, using machine learning techniques to continuously refine its decision-making process based on observed outcomes.

Real-time adaptation may be implemented in the decompression decision process. The client manager can monitor the actual performance implications of its decisions and adjusts its strategy dynamically. If it observes that client-side decompression is causing performance issues or that network conditions have changed significantly, it can modify its approach mid-stream. For instance, if network congestion suddenly increases, the system might switch to sending compressed data even if it originally decided on uncompressed transmission. This adaptive behavior may comprise buffering strategies that can switch between compressed and uncompressed transmission while maintaining result consistency and order.

The entire decision-making process operates within the context of system-wide resource management. The client manager coordinates with other system components to ensure its decisions align with overall system performance goals. For example, if the server is experiencing high load, the decision engine may prefer client-side decompression even for less capable clients to reduce server resource consumption. Similarly, if multiple clients are requesting similar data, the system may maintain compressed results in a shared cache, making decisions about decompression points that optimize overall system performance rather than individual client efficiency.

Figure 3:
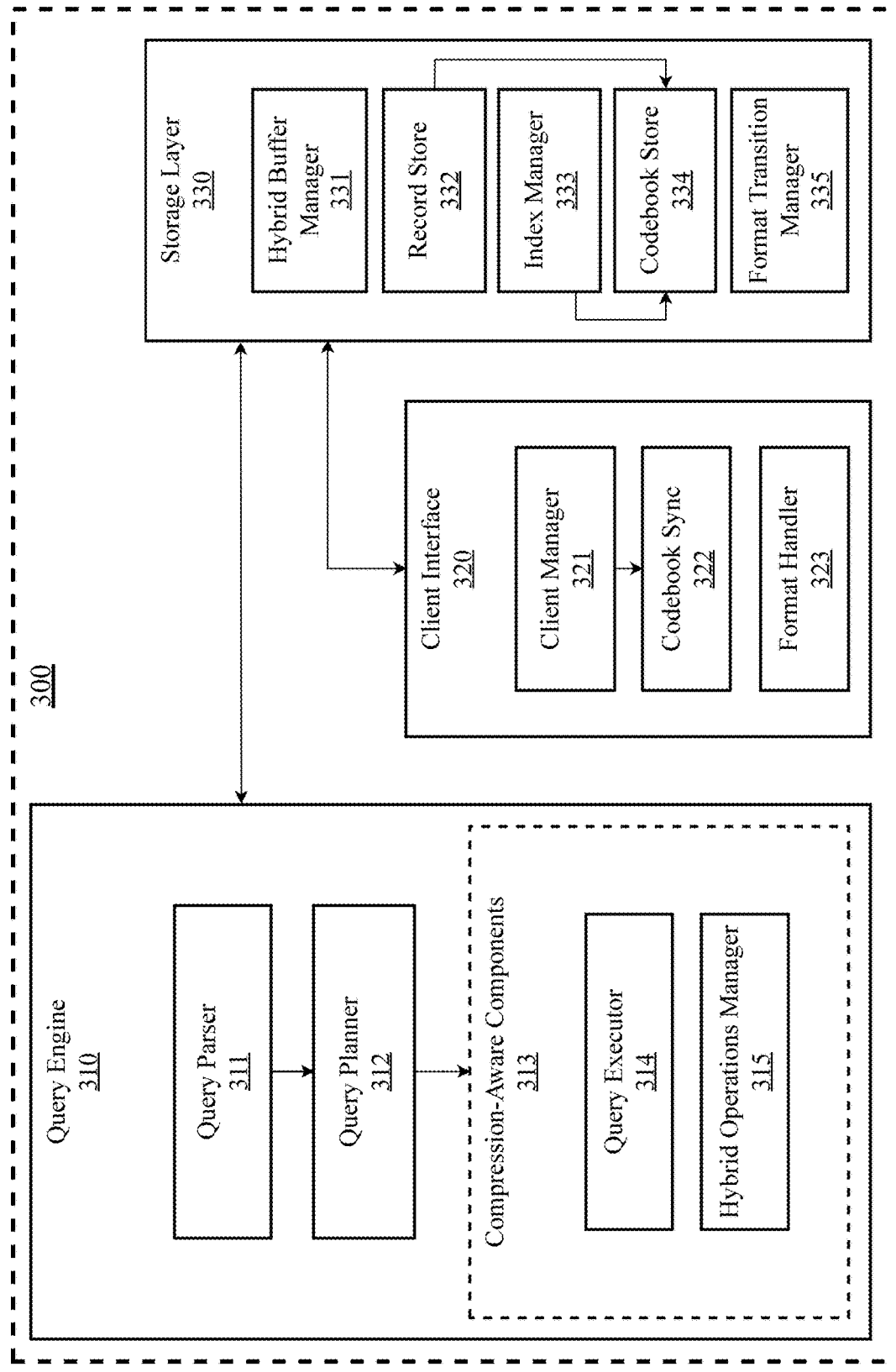
FIG. 3 is a block diagram illustrating an exemplary system architecture for a codeword-native database management platform configured to support hybrid operations with both compressed and uncompressed data, according to an embodiment.

FIG. 3 is a block diagram illustrating an exemplary system architecture for a codeword-native database management platform configured to support hybrid operations with both compressed and uncompressed data, according to an embodiment. According to the embodiment, codeword-native database management platform 300 comprises a query engine 310, a client interface 320, and a storage layer 330. The exemplary architecture implements a hybrid buffer manager 331 as a new top-level component that orchestrates operations across both compressed and uncompressed data domains. This component maintains a comprehensive metadata registry that tracks which tables, columns, or even individual data segments are stored as codewords versus traditional formats. The registry may implement a versioning system that manages transitions between compressed and uncompressed states, including partial compression scenarios where only specific columns or row ranges are compressed. This component works closely with all other system components to ensure optimal handling of mixed-format data operations.

According to the embodiment, storage layer 330 undergoes modification to handle hybrid storage patterns efficiently. A record store 332 can implement a dual-format page structure that can accommodate both compressed and uncompressed records within the same table, using a specialized page header format that indicates compression status and schemes used. A buffer manager 331 is configured to implement intelligent buffering strategies that consider the different memory requirements and access patterns of compressed versus uncompressed pages. An index manager 333 maintains hybrid indexes that can efficiently handle both compressed and uncompressed key values, implementing specialized comparison operators that work across these different representations. The codebook store 334 can store a plurality of codebooks which may be generated using one or more coding schemes. An additional component is the format transition manager 335, which handles the conversion between compressed and uncompressed formats when necessary, implementing sophisticated caching strategies to minimize repeated conversions.

According to the embodiment, query engine's 310 capabilities are expanded to handle hybrid query processing efficiently. The query parser 311 and planner 312 now generate execution plans that can optimize operations across compressed and uncompressed data. This may comprise implementing one or more cost models that consider the tradeoffs between operating in either domain. The compression-aware components 313 comprise a query executor 314 and hybrid operations manager 315. The query executor 314 may implement new hybrid operators that can efficiently process mixed-format data, including specialized join algorithms that can operate across compression boundaries. For example, when joining a compressed table with an uncompressed one, the system might dynamically decide whether to decompress the compressed data or compress the uncompressed data based on cardinality and selectivity estimates.

According to the embodiment, hybrid operations manager 315 is present and configured for format-aware operation routing, where it determines the optimal execution path for queries involving mixed data formats. For example, when handling a join between a compressed table and an uncompressed table, it dynamically decides whether to decompress the compressed side or compress the uncompressed side based on factors like data size, compression ratio, and query selectivity. It may maintain a cost model that considers CPU overhead for compression/decompression, memory utilization, and expected query performance to make these decisions.

According to an aspect, hybrid operations manager 315 implements one or more specialized operators that can work directly across format boundaries. This may comprise hybrid join operators that can match compressed keys with uncompressed ones without full decompression, hybrid aggregation operators that can combine results from both domains, and hybrid sorting mechanisms that can efficiently order mixed-format data. For example, when sorting a column that is partially compressed with alphabetic coding, it can utilize the order-preserving properties of the compressed portion while coordinating with traditional sorting for the uncompressed portion.

Hybrid operations manager 315 can further facilitate transaction management across format boundaries, ensuring ACID properties are maintained when operations span compressed and uncompressed data. It can coordinate with format transition manager 335 to handle any necessary conversions during transaction processing, maintaining proper isolation levels and ensuring consistency across format boundaries. Additionally, it may implement a caching strategy that optimizes memory usage for hybrid operations. This may comprise maintaining separate caches for compressed and uncompressed data, with intelligent prefetching mechanisms that consider the different access patterns and processing requirements of each format.

According to the embodiment, client interface layer 320 implements enhanced protocols to handle mixed-format data transmission efficiently. It can implement intelligent buffering strategies that can optimize network transmission by selectively compressing or decompressing data based on client capabilities and network conditions. A codebook sync 322 component's functionality expands to include partial codebook distribution, where clients might only need codebooks for specific subsets of compressed data they're accessing. A format handler 323 is a specialized component within the client interface layer that manages the complexities of data format transitions and communications between clients and the server.

According to an aspect, format handler 323 implements a protocol for determining how data should be transmitted between client and server based on multiple factors. It begins by assessing client capabilities through a handshake process that establishes which compression formats the client can handle directly. This may comprise checking for available codebooks, processing power, and memory constraints on the client side. In some implementations, the handler maintains a client capability profile that is continuously updated based on observed performance metrics.

For result set transmission, format handler 323 implements an intelligent buffering system that can handle mixed-format data streams. When processing query results that contain both compressed and uncompressed data, it makes dynamic decisions about how to transmit each portion. For example, if a query returns results from both compressed and uncompressed columns, format handler 323 may choose to: keep compressed data in its native format for clients that can handle it directly; decompress data for clients with limited processing capabilities; selectively compress uncompressed data if network bandwidth is constrained; or buffer and batch similar format types to optimize transmission.

The format handler also manages format transitions required for client-side operations. When clients need to perform local processing on result sets, format handler 323 determines whether to transform the data based on the specific operations required. It coordinates with codebook sync 322 to ensure clients have the necessary compression metadata for any compressed data they receive.

Additionally, format handler 323 may comprise error handling and recovery mechanisms for dealing with format-related issues during data transmission. If a client loses sync with a codebook or encounters format-related errors, the handler can initiate recovery procedures without requiring a full query restart.

The encoder component may be modified to support incremental and partial compression operations. It may employ analysis algorithms that can recommend which portions of the data would benefit most from compression based on access patterns, update frequencies, and query requirements. The encoder may be configured to operate in a streaming mode where it processes data incrementally, allowing for dynamic decisions about compression as data characteristics evolve.

Throughout this hybrid architecture, the system implements one or more optimizations to maintain performance. These may include, but are not limited to, intelligent caching strategies that consider the different access patterns of compressed and uncompressed data, dynamic format conversion based on query patterns and system load, and sophisticated cost models that can optimize query execution across mixed-format operations. The system maintains statistics about the performance characteristics of different operations in both compressed and uncompressed domains, using these to make intelligent decisions about data format transitions and query execution strategies.

This exemplary hybrid architecture demonstrates how a database system can efficiently manage both compressed and uncompressed data while maintaining high performance and data consistency. The careful coordination between components and the careful handling of format transitions enables the system to achieve optimal performance while providing flexibility in how data is stored and processed.

The system can dynamically adapt to changing workload patterns by selectively compressing or decompressing data based on observed access patterns and performance requirements, providing a robust platform for mixed-format database operations.

According to various embodiments, codeword-native database management platform is configured to support conditional variants of the various coding schemes employed by the platform. The conditional variants of coding schemes in the codeword-native database platform represent sophisticated adaptations of traditional compression algorithms, designed to meet specific operational constraints while maintaining compression efficiency. The implementation of these variants allows the system to balance compression ratios with practical limitations imposed by hardware, memory, or performance requirements.

Length-constrained Huffman coding represents an exemplary conditional variant where codewords are restricted to a maximum length N. This modification is particularly valuable in database operations where predictable decode times are essential. The implementation uses a modified Huffman tree construction algorithm that enforces the length constraint by redistributing probabilities when a codeword would exceed length N. For example, in a scenario where N=8, if the standard Huffman algorithm would generate a codeword of length 10 for rare values, the algorithm instead allocates an 8-bit codeword, slightly reducing compression efficiency but ensuring consistent decode performance. This variant is particularly useful for high-performance transaction processing where predictable operation timing is crucial.

Alphabetic coding can implement conditional variants that maintain order-preservation while adhering to specific balance constraints. One such variant enforces a maximum height difference between sibling nodes in the coding tree, ensuring more uniform access patterns. This modification is particularly valuable for range queries on compressed data, as it prevents extreme variations in codeword lengths that could impact query performance. The system may be configured to enforce a constraint where the length difference between any two sibling nodes cannot exceed 2, trading some compression efficiency for more consistent query performance.

Tunstall coding can be adapted with conditional variants that maintain fixed-length output blocks while optimizing for specific input patterns. For example, a variant may be constrained to generate codewords that align with hardware memory page sizes, optimizing for system-level I/O operations. Another variant may optimize the dictionary selection based on observed query patterns, prioritizing frequently accessed data patterns even if they don't provide optimal compression ratios.

Neural compression implementations can incorporate conditional variants that balance compression ratio with computational complexity. For example, the autoencoder architecture may be constrained to produce latent representations of fixed dimensionality, or the model complexity might be bounded to ensure encoding/decoding operations complete within a specified time budget. These constraints are particularly important in maintaining predictable performance in production database environments.

According to an aspect, the system implements these conditional variants through a selection process that considers both the constraints and their impact on database operations. For example, when compressing a column that requires both order preservation and predictable decode times, the system might select a length-constrained alphabetic coding variant that balances these requirements. The selection process includes performance simulation with actual workload patterns to ensure the chosen variant meets both the conditional constraints and the operational requirements of the system.

The codeword-native database platform provides a flexible and intuitive interface for users to set conditional variants and constraints on compression schemes. At the system level, users can establish global compression policies through a configuration management interface (which may be implemented as subsystem of the client interface) that allows specification of constraints such as maximum codeword lengths, tree balance requirements, and performance thresholds. These global settings can be refined at the database, table, or column level through an extended SQL syntax that integrates naturally with standard database definition language. For example, when creating or modifying tables, users can specify compression constraints such as Huffman coding with a maximum codeword length of 8 bits, alphabetic coding with balanced tree requirements, or neural compression with fixed latent dimensionality and encode/decode time limits. The platform implements a hierarchical configuration system where more specific settings override global defaults, allowing for fine-grained control over compression behavior. Users can modify these settings dynamically through administrative commands or programmatically through the system's management application programming interface (API), with the platform ensuring that any changes maintain data consistency and operational integrity. The system also provides monitoring and validation capabilities to ensure that specified constraints are being met and to alert administrators when compression performance deviates from configured requirements.

Detailed Description of Exemplary Aspects

The methods and processes described herein are illustrative examples and should not be construed as limiting the scope or applicability of the codeword-native database management platform. These exemplary implementations serve to demonstrate the versatility and adaptability of the platform. It is important to note that the described methods may be executed with varying numbers of steps, potentially including additional steps not explicitly outlined or omitting certain described steps, while still maintaining core functionality. The modular and flexible nature of the codeword-native database management platform allows for numerous alternative implementations and variations tailored to specific use cases or technological environments. As the field evolves, it is anticipated that novel methods and applications will emerge, leveraging the fundamental principles and components of the platform in innovative ways. Therefore, the examples provided should be viewed as a foundation upon which further innovations can be built, rather than an exhaustive representation of the platform's capabilities.

Figure 4:
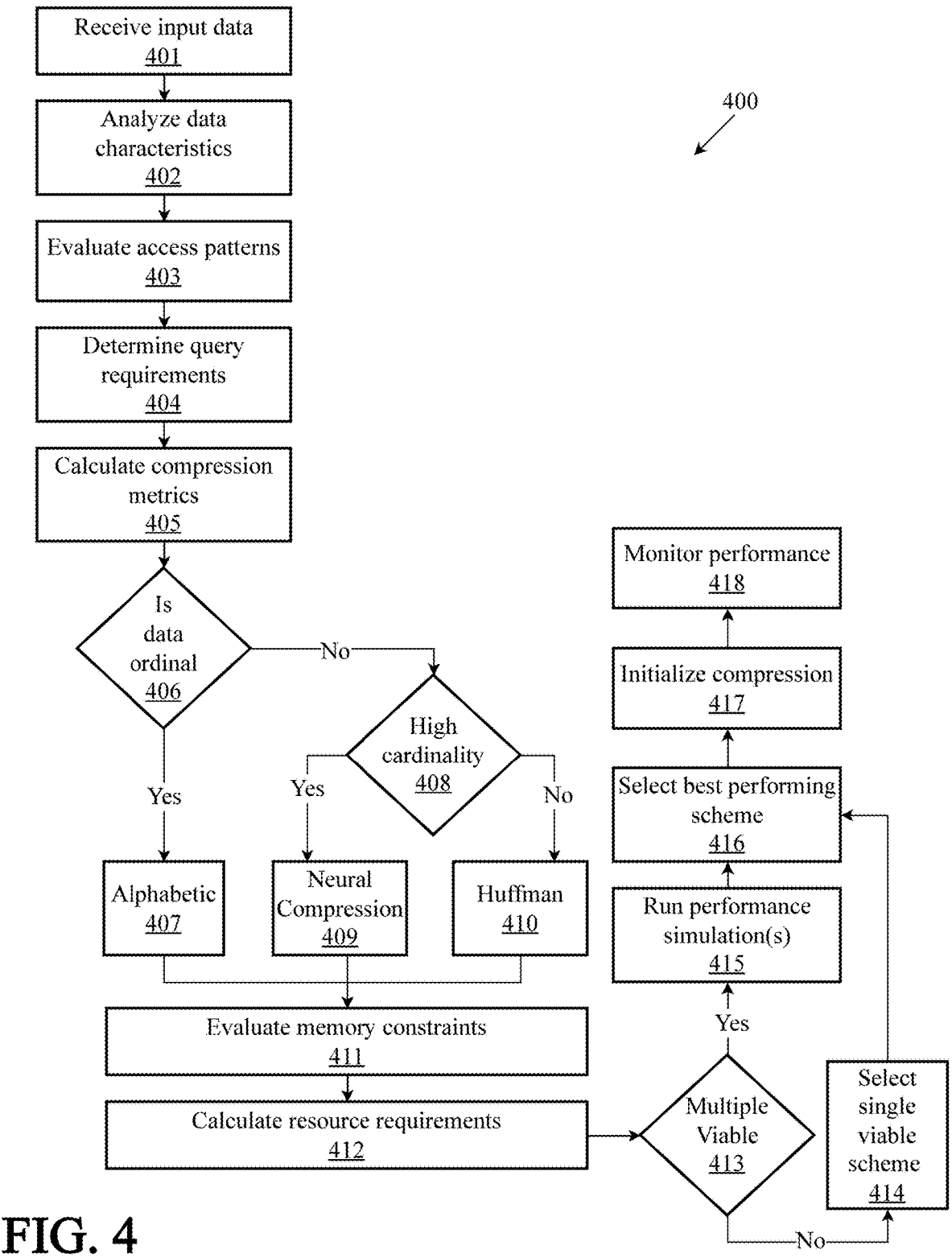
FIG. 4 is a flow diagram illustrating an exemplary method for compression scheme selection, according to an embodiment.

FIG. 4 is a flow diagram illustrating an exemplary method 400 for compression scheme selection, according to an embodiment. The compression scheme selection method implements a decision-making process that analyzes multiple factors to determine the optimal compression approach for incoming data in the codeword-native database platform. According to the embodiment, the process begins at step 401 with the initial receipt of input data, where the system collects baseline statistics including data type, size, and basic distribution characteristics. A data analyzer then performs a deep statistical analysis at step 402, examining value distributions, cardinality, and potential patterns in the data. This may comprise calculating entropy measures, identifying value ranges, and determining the presence of any natural ordering in the data.

The method proceeds to evaluate access patterns by analyzing historical query logs and current workload characteristics at step 403. This may comprise examining query types (point queries vs. range queries), update frequencies, and typical access patterns (sequential vs. random). The system can determine specific query requirements at step 404, including, but not limited to, the need for order preservation, random access capabilities, and performance constraints for different operation types. Compression metrics are calculated at step 405, including, but not limited to, potential compression ratios for different schemes, memory overhead requirements, and processing costs for compression and decompression operations.

The decision tree then branches based on data characteristics. A check is made at 406 for data ordinality. For ordinal data, the system evaluates alphabetic coding schemes at step 407, particularly considering the Hu-Tucker algorithm for order-preserving compression. A check is made at 408 to determine the cardinality of the input data. For high-cardinality data, the system considers neural compression through autoencoder implementations at step 409, while lower-cardinality data may be evaluated for Huffman coding potential at step 410 The method then evaluates memory constraints at step 411 and calculates resource requirements for each viable scheme at step 412, including both storage and computational overhead.

The decision process at step 413 evaluates whether multiple compression schemes remain viable after the initial analysis phases. When multiple schemes are viable, the system enters a performance simulation phase at step 415 where it conducts a series of benchmark tests using sample data. These simulations evaluate each candidate scheme's performance across various operational scenarios, measuring factors such as compression/decompression speed, query response time, and memory utilization under typical workload conditions. For example, if both alphabetic coding and a specialized Huffman variant remain viable for a timestamp column, the system would simulate range queries and point queries using both schemes to determine actual performance characteristics.

In cases where only a single viable scheme remains after the initial analysis at step 414, the system proceeds directly to scheme selection at step 416, bypassing the performance simulation phase. This might occur, for instance, when dealing with categorical data that requires order preservation, leaving alphabetic coding as the only suitable option. Both paths converge at step 416, where the final scheme selection occurs based either on simulation results or single-scheme viability.

The initialization phase at step 417 implements the selected compression scheme, comprising codebook generation, metadata setup, and initial data compression. This may further comprise establishing baseline performance metrics for monitoring purposes and configuring any necessary system parameters specific to the chosen compression method. At step 418, the system implements continuous performance tracking, collecting metrics on compression efficiency (e.g., compression rations over time, query response time for different operations types, decompression frequency and timing, cache hit rates for compressed vs. decompressed data, throughput measurements for bulk operations, etc.), query performance, error and exception metrics (e.g., compression failures, codebook synchronization issues, decompression errors, performance threshold violations, recovery operation frequency, etc.), and resource utilization (e.g., memory usage for codebook storage, CPU utilization during compression/decompression, I/O patterns with compressed data access, buffer pool efficiency with compressed data, network bandwidth savings from compressed data transfer, etc.). This ongoing monitoring enables dynamic optimization and potential scheme adaptation if performance deteriorates or access patterns change significantly.

For example, consider a database table column containing timestamp data that is frequently used in range queries. The method would proceed as follows: The system first analyzes the timestamp data, identifying it as ordinal with regular patterns. Access pattern analysis reveals frequent range queries and sequential scans. The system evaluates alphabetic coding as the primary candidate due to its order-preserving properties, calculating an expected compression ratio of 3:1. Resource calculation shows acceptable memory overhead for maintaining the codebook. Performance simulation confirms that range queries can operate directly on the compressed data without decompression. The system selects alphabetic coding and initializes compression with optimized parameters for timestamp data. Monitoring begins to track query performance and compression efficiency, with the system maintaining metrics for potential future re-optimization.

This methodological approach ensures that the selected compression scheme aligns with both data characteristics and operational requirements while maintaining optimal performance in the codeword-native database environment. The process continues to monitor performance post-implementation, allowing for adaptive optimization as usage patterns evolve.

Figure 5:
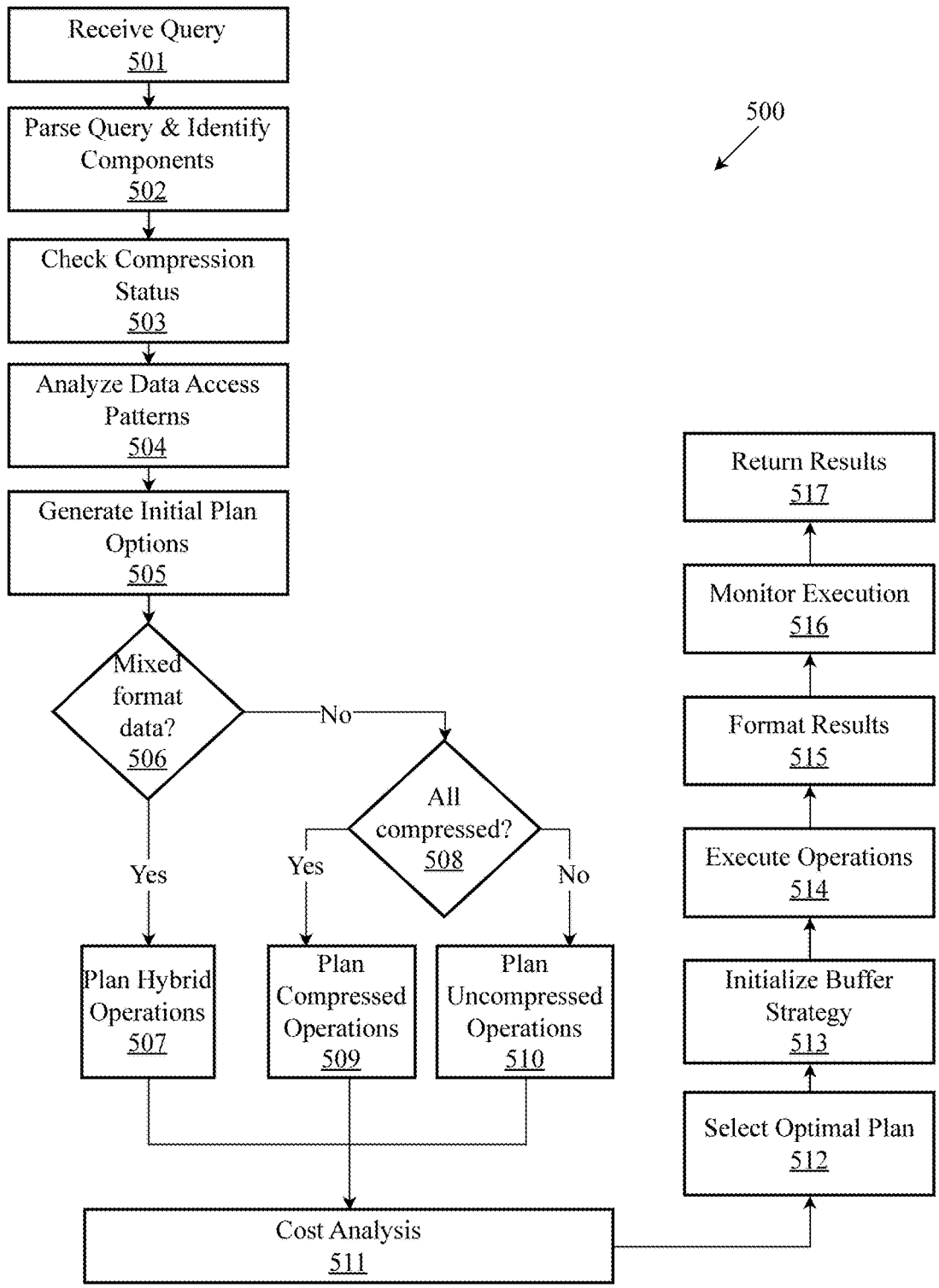
FIG. 5 is a flow diagram illustrating an exemplary method for query processing, according to an embodiment.

FIG. 5 is a flow diagram illustrating an exemplary method 500 for query processing, according to an embodiment. The query processing method in a codeword-native database system comprises handling queries across compressed and uncompressed data domains. According to the embodiment, the process begins at step 501 with query reception and parsing at step 502, where the system analyzes the SQL query to identify its components, including selection predicates, join conditions, and projection lists. The compression status check at step 503 examines the format of all involved data objects, consulting the system catalog to determine which tables and columns are compressed and with what schemes. This information is used for subsequent planning decisions.

The method then analyzes data access patterns specific to the query at step 504, considering factors such as whether range predicates can utilize order-preserving compression schemes directly, or whether point queries can benefit from Huffman-coded equality comparisons. The planner generates multiple candidate execution plans (507, 509, 510) at step 505, taking into account the available compression schemes and potential optimization strategies. A check is made at 506 to determine the data format. A hybrid plan may be generated for mixed data at 507. A check is made at 508 to determine if the data is fully compressed. For hybrid scenarios involving both compressed and uncompressed data, the planner develops specialized operations at 510 that can efficiently handle format transitions while minimizing unnecessary decompression. A cost analysis is performed at step 511 to determine the optimal plan of the plurality of generated plans. The most optimal plan may be selected at step 512

Consider an example query: "SELECT order_date, total_amount FROM orders WHERE order_date BETWEEN '2024-01-01' AND '2024-03-31' AND status='PENDING' ORDER BY total_amount". In this case, if order_date is compressed using alphabetic coding, status uses Huffman coding, and total_amount is uncompressed, the system would process as follows: The planner recognizes that the date range comparison can be performed directly on compressed values, while the status comparison requires a simple Huffman-coded equality check. The ordering operation on total_amount requires uncompressed values, so the planner strategically places the decompression operation to minimize its impact. The cost analyzer evaluates different approaches, such as performing the date and status filters before decompressing for sorting, versus alternative orderings of operations.

The buffer strategy initialization at step 513 establishes memory management policies specific to the query's needs, such as reserving buffer pool space for compressed data pages and setting up format transition buffers where needed. During execution at step 514, the system monitors various performance metrics including compression efficiency at step 516, operation timing, and resource utilization. The final results are formatted at step 515 according to client capabilities and preferences, with options for returning compressed data to clients that can handle it directly at step 517.

This exemplary approach ensures efficient query processing across different data formats while maintaining optimal performance through intelligent planning and execution strategies. The process continues to gather performance metrics throughout execution, enabling dynamic optimization and informing future query planning decisions.

Figure 6:
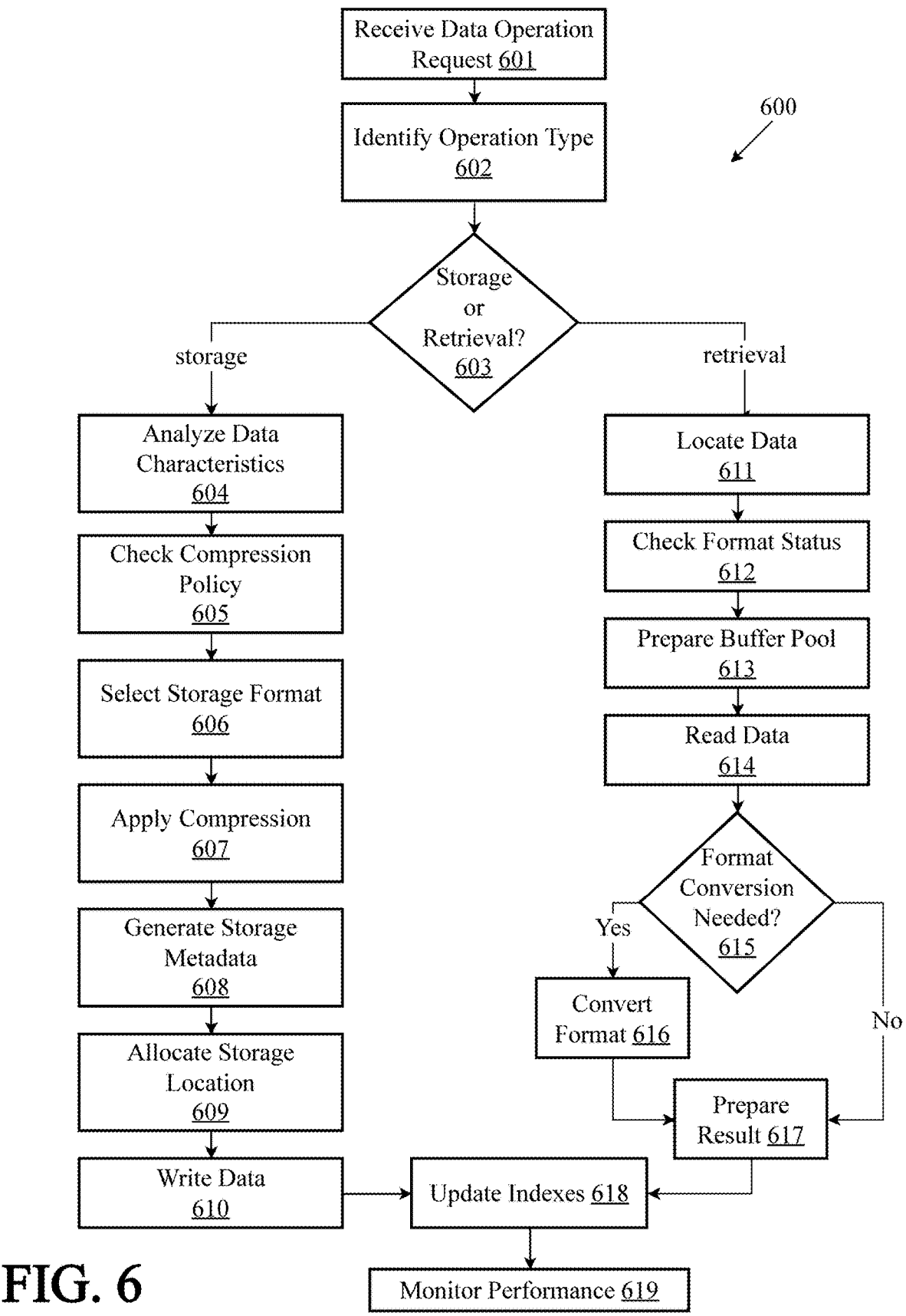
FIG. 6 is a flow diagram illustrating an exemplary method for data storage and retrieval, according to an embodiment.

FIG. 6 is a flow diagram illustrating an exemplary method 600 for data storage and retrieval, according to an embodiment. The data storage and retrieval method in the codeword-native database system implements a comprehensive approach to managing data operations across both compressed and uncompressed formats. According to the embodiment, the process begins with step 601, receiving a data operation request, where the system accepts incoming requests for either storage or retrieval operations. At step 602, the system identifies the specific type of operation being requested, analyzing the operation parameters and requirements.

At step 603, the process branches based on whether it's a storage or retrieval operation. For storage operations, step 604 initiates a detailed analysis of data characteristics, examining factors such as data type, cardinality, and value distribution patterns. Step 605 comprises checking the system's compression policy, which considers factors like table-level compression settings and column-specific requirements.

At step 606, the system selects an appropriate storage format based on the analysis and policy checks. At step 607 applies the selected compression scheme if compression is indicated, using the appropriate algorithm (Huffman, alphabetic, Tunstall, neural compression, etc.). At step 608 the system generates comprehensive storage metadata, including compression scheme identifiers, codebook references, and format indicators.

The system handles storage location allocation at step 609, considering factors like page alignment and compression block boundaries. At step 610 the system performs the actual data writing operation, ensuring atomic writes and maintaining data integrity.

For retrieval operations, step 611 locates the requested data using available indexes and metadata. The system checks the format status of the located data at step 612, determining whether it's compressed and with what scheme.

Step 613 prepares the buffer pool, allocating appropriate space and setting up format-specific buffers.

Step 614 performs the actual data read operation, followed by step a check at 615 which determines if format conversion is needed based on the request requirements. If conversion is needed, step 616 performs the necessary format conversions. Step 617 prepares the final result set in the required format.

Step 618 handles index updates for both storage and retrieval paths, ensuring all relevant indexes are maintained accurately. At step 619, the system monitors performance metrics throughout the operation, collecting data about compression efficiency, operation timing, and resource utilization.

Consider an example where a system needs to store a new column of timestamp data in a table. The process may proceed as follows: The system receives the storage request and identifies it as a new column addition. Data analysis reveals a timestamp column with regular patterns and frequent range queries. The compression policy check indicates this column should be compressed. The system selects alphabetic coding as the storage format due to the need for order preservation. Compression is applied using the selected scheme, and metadata is generated including the compression scheme identifier and codebook reference. The system allocates appropriate storage locations considering the compressed block size. The compressed data is written to storage, and the relevant indexes are updated to reference the compressed values. Throughout the process, the system monitors performance metrics such as compression ratio achieved and storage operation timing.

Exemplary Computing Environment

Figure 7:
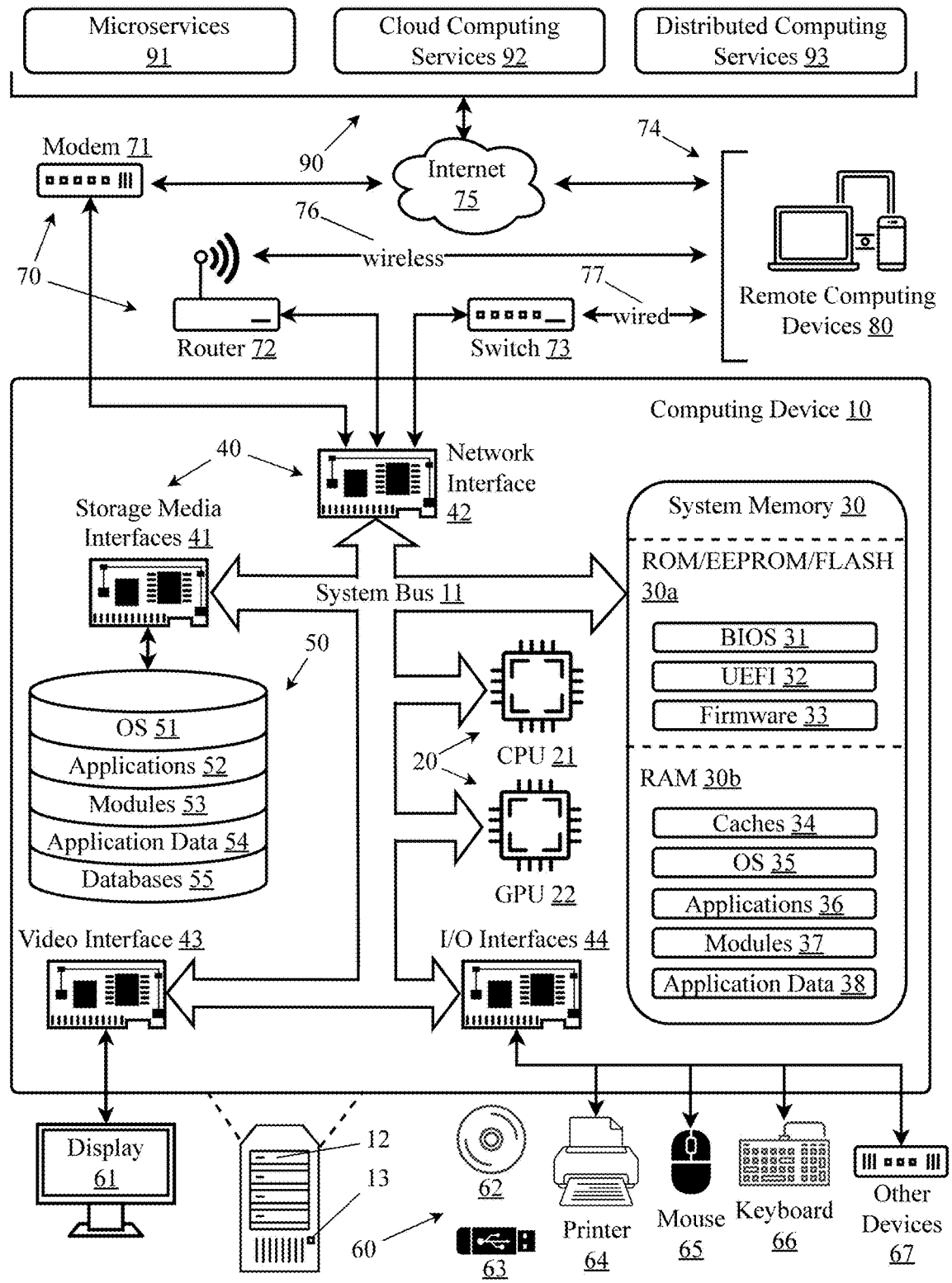
FIG. 7 illustrates an exemplary computing environment on which an embodiment described herein may be implemented.

FIG. 7 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Gitlab, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerd resources is used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computing system for database operation execution using native compressed data, the computing system comprising:
   one or more hardware processors configured for:
   receiving a database query directed to data stored in a compressed format;
   determining compression characteristics of the stored data, the compression characteristics comprising compression schemes and encoding parameters employed;
   generating a query execution plan that enables direct operations on the compressed data without requiring complete decompression;
   executing the database query by performing operations directly on the compressed data according to the generated execution plan; and
   providing query results while maintaining data in a compressed state where possible.

2. The computing system of claim 1, wherein determining compression characteristics comprises:
   identifying compression schemes applied to different data portions;
   analyzing compression constraints and conditional variants in use;
   evaluating order-preservation requirements for compressed data; and
   determining opportunities for direct compressed operations.

3. The computing system of claim 1, wherein generating the query execution plan comprises:
   analyzing query requirements against compression characteristics;
   identifying operations executable directly on compressed data;
   determining necessary format transitions;
   optimizing operation ordering to minimize decompression; and
   allocating resources for compressed data processing.

4. The computing system of claim 1, wherein executing the database query comprises:
   performing comparison operations directly on compressed keys;
   managing hybrid operations across compressed and uncompressed data;
   maintaining transactional consistency during compressed operations;
   utilizing compression-aware buffer management; and
   coordinating format transitions when required.

5. The computing system of claim 1, wherein providing query results comprises:
   determining client capability for handling compressed data;
   maintaining compression where supported by client systems;
   performing selective decompression based on client requirements;
   optimizing result transmission through compressed data transfer; and
   ensuring consistency of compression metadata across client-server boundaries.

6. A computer-implemented method executed on a database management platform for database operation execution using native compressed data, the computer-implemented method comprising:
   receiving a database query directed to data stored in a compressed format;
   determining compression characteristics of the stored data, the compression characteristics comprising compression schemes and encoding parameters employed;
   generating a query execution plan that enables direct operations on the compressed data without requiring complete decompression;
   executing the database query by performing operations directly on the compressed data according to the generated execution plan; and
   providing query results while maintaining data in a compressed state where possible.

7. The computer-implemented method of claim 6, wherein determining compression characteristics comprises:
   identifying compression schemes applied to different data portions;
   analyzing compression constraints and conditional variants in use;
   evaluating order-preservation requirements for compressed data; and
   determining opportunities for direct compressed operations.

8. The computer-implemented method of claim 6, wherein generating the query execution plan comprises:
   analyzing query requirements against compression characteristics;
   identifying operations executable directly on compressed data;
   determining necessary format transitions;
   optimizing operation ordering to minimize decompression; and
   allocating resources for compressed data processing.

9. The computer-implemented method of claim 6, wherein executing the database query comprises:
   performing comparison operations directly on compressed keys;
   managing hybrid operations across compressed and uncompressed data;
   maintaining transactional consistency during compressed operations;
   utilizing compression-aware buffer management; and
   coordinating format transitions when required.

10. The computer-implemented method of claim 6, wherein providing query results comprises:
    determining client capability for handling compressed data;
    maintaining compression where supported by client systems;
    performing selective decompression based on client requirements;
    optimizing result transmission through compressed data transfer; and
    ensuring consistency of compression metadata across client-server boundaries.

11. A system for database operation execution using native compressed data, comprising one or more computers with executable instructions that, when executed, cause the system to:
    receive a database query directed to data stored in a compressed format;

determine compression characteristics of the stored data, the compression characteristics comprising compression schemes and encoding parameters employed;

generate a query execution plan that enables direct operations on the compressed data without requiring complete decompression;

execute the database query by performing operations directly on the compressed data according to the generated execution plan; and provide query results while maintaining data in a compressed state where possible.

12. The system of claim 11, wherein determining compression characteristics comprises:

identifying compression schemes applied to different data portions;

analyzing compression constraints and conditional variants in use;

evaluating order-preservation requirements for compressed data; and determining opportunities for direct compressed operations.

13. The system of claim 11, wherein generating the query execution plan comprises:

analyzing query requirements against compression characteristics;

identifying operations executable directly on compressed data;

determining necessary format transitions;

optimizing operation ordering to minimize decompression; and allocating resources for compressed data processing.

14. The system of claim 11, wherein executing the database query comprises:

performing comparison operations directly on compressed keys;

managing hybrid operations across compressed and uncompressed data;

maintaining transactional consistency during compressed operations;

utilizing compression-aware buffer management; and coordinating format transitions when required.

15. The system of claim 11, wherein providing query results comprises:

determining client capability for handling compressed data;

maintaining compression where supported by client systems;

performing selective decompression based on client requirements;

optimizing result transmission through compressed data transfer; and ensuring consistency of compression metadata across client-server boundaries.

* * * * *